United States Patent [19]
DiPiazza et al.

[11] Patent Number: 6,028,970
[45] Date of Patent: Feb. 22, 2000

[54] METHOD AND APPARATUS FOR ENHANCING OPTICAL CHARACTER RECOGNITION

[75] Inventors: Philip Silvano DiPiazza, Morganville; Thomas C. Redman, Rumson, both of N.J.

[73] Assignee: AT&T Corp, New York, N.Y.

[21] Appl. No.: 08/949,312

[22] Filed: Oct. 14, 1997

[51] Int. Cl.[7] .................................................. G06K 9/03
[52] U.S. Cl. .......................................... 382/309; 382/229
[58] Field of Search .................. 382/309–311, 229–231, 382/176

[56] References Cited

U.S. PATENT DOCUMENTS

| | | | |
|---|---|---|---|
| 4,876,731 | 10/1989 | Loris et al. | 382/229 |
| 4,893,333 | 1/1990 | Baran et al. | 379/100.11 |
| 5,077,742 | 12/1991 | Tsumura et al. | 371/32 |
| 5,119,437 | 6/1992 | Kuwamura et al. | 382/175 |
| 5,131,053 | 7/1992 | Bernzott et al. | 382/9 |
| 5,133,026 | 7/1992 | Fujiwara et al. | 382/161 |
| 5,159,667 | 10/1992 | Borrey et al. | 395/761 |
| 5,235,653 | 8/1993 | Nakano et al. | 382/175 |
| 5,235,654 | 8/1993 | Anderson et al. | 382/180 |
| 5,239,593 | 8/1993 | Wittner et al. | 382/158 |
| 5,251,273 | 10/1993 | Betts et al. | 382/311 |
| 5,305,396 | 4/1994 | Betts et al. | 382/175 |
| 5,371,807 | 12/1994 | Register et al. | 382/159 |
| 5,530,907 | 6/1996 | Pavey et al. | 395/889 |
| 5,542,006 | 7/1996 | Shustorovich et al. | 382/156 |
| 5,555,101 | 9/1996 | Larson et al. | 358/403 |
| 5,608,874 | 3/1997 | Ogawa et al. | 395/200.15 |
| 5,642,435 | 6/1997 | Loris | 382/229 |

OTHER PUBLICATIONS

A. Moore, "The Forms Processing Paradigm Shift," Imaging Magazine, Mar. 1995, pp. 84–106.

*Primary Examiner*—Amelia Au
*Assistant Examiner*—Martin E Miller

[57] ABSTRACT

A method and apparatus for enhancing optical character recognition comprises a data processor and memory for maintaining an error detection and correction log. The data processor maintains a memory table of a plurality of rules for generating a rule base determined by recognition of a particular context type of an electronic bit-map portion. The appropriate rule base comprises rules and combinations of rules for application to bit-map portion data. A rule, a rule base or data may be selected and obtained from an internal or external memory. Upon application of the rule base, the error detection and correction log maintains a record of clear errors, corrected data, failed rules of the rule base and the original bit map. Possible errors are flagged and clear errors are automatically corrected provided a confidence level in the correction is reached or exceeded. Through validation by a source or from operator intervention, real-time learning is obtained from detecting and/or correcting errors or updating the rules of the rule table and the data upon which they operate. Through recognition of patterns of errors in the error detection and correction log, new rules may be generated for storage in the rule memory table, erroneous data corrected or incomplete data of the received forms or data fields themselves completed through context based analysis.

33 Claims, 5 Drawing Sheets

SAMPLE ORDER FORM: XYZ CORPORATION

500

NAME:________________________

STREET:______________________ ⎫

CITY,STATE____________ ZIP_____ ⎬ 510
                                 ⎭

ARE YOU:

501 — REQUESTING OUR NEWEST CATALOG___

502 — ORDERING MERCHANDISE___

515 — TODAY'S DATE__________

520 — DATE MERCHANDISE DESIRED__________(4-6 WEEKS UNLESS SPECIFIED)

| NO. | CATALOG ID | DESCRIPTION | SIZE | QTY | PRICE | ITEM TOTAL | |
|---|---|---|---|---|---|---|---|
| 1 | | | | | | | — 541 |
| 2 | | | | | | | — 542 |
| 3 | | | | | | | |
| 4 | | | | | | | |
| 5 | | | | | | | |
| | | NUMBER OF ITEMS ORDERED | | | SUBTOTAL | | — 540 |
| | | | | | TAX:5% | | — 550 |
| | | | | | GRAND TOTAL | | |

525 — (rows 2)
530 — (row 3)
560 (NUMBER OF ITEMS ORDERED)
535 (QTY)
551 — (TAX:5%)

PAYMENT INFORMATION:
CHECK ENCLOSED___
CREDIT CARD PAYMENT
CARD TYPE: VISA__ MASTERCARD__ AMEX__
CARD NUMBER__________
EXPIRATION DATE__________
CARD LIMIT__________

PLEASE HELP US KNOW MORE ABOUT YOU SO WE MAY SERVE YOU BETTER.
PLEASE CHECK ONLY ONE BOX.

505 ⎰ YOUR ANNUAL INCOME:
     ⎹ $0-$19,999_
     ⎹ $20,000-$39,999_
     ⎨ $40,000-$59,999_
     ⎹ $60,000-$79,999_
     ⎹ $80,000-$99,999_
     ⎱ OVER $100,000_

METHOD AND APPARATUS FOR ENHANCING OPTICAL CHARACTER RECOGNITION

BACKGROUND OF THE INVENTION

1. Technical Field

This invention relates to the field of optical character recognition and, in particular, to enhancing optical character recognition processes through a modular approach including the development of an error detection and correction log in memory and updating a database of rules for correcting erroneous data through real-time learning from source validation or long-term learning from the error detection and correction log.

2. Description of the Relevant Art

Figure 1A:
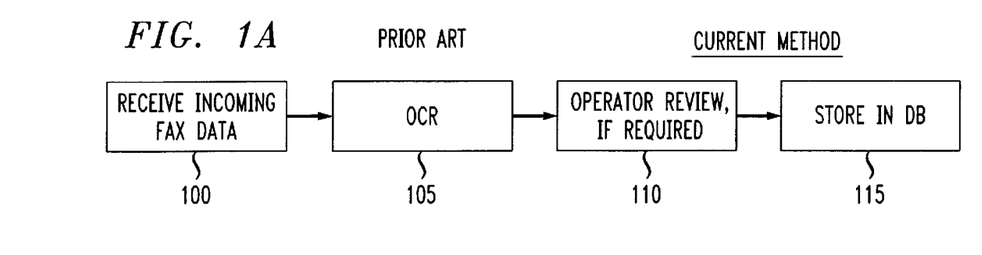
FIG. 1A represents a known optical character recognition method, wherein portions of a received electronic bit map may be flagged during optical character recognition to indicate a possible error so that an operator, reviewing the possible error, may take remedial action.

Referring to FIG. 1A, there is shown a process flow chart for known optical character recognition systems. The example shown involves receipt of incoming facsimile data, for example, at a facsimile machine or a personal computer. Similar reference characters denote similar steps throughout FIG. 1. Optical Character Recognition (OCR) 105 is employed to translate electronic bit-maps, for example, representing incoming facsimile data received at step 100 into computer characters. The original may comprise machine generated characters or symbols or graphic elements such as picture elements of a photograph or may comprise human hand-written characters, symbols or graphic elements. Bit-maps are simply digital representations of such data appearing in an original document or other tangible medium of expression or comprise digital copies thereof. An electronic bit-map, for example, may result from the electronic scanning of an original for facsimile transmission over telecommunication lines received into a facsimile machine or personal computer or other device at step 100. The density of bits in a contiguous cluster of bits of a bit-map portion may represent an alphabetic character or other symbol that may be computer recognizable.

For example, U.S. Pat. No. 5,542,006 to Shustorovich et al. discloses OCR neural network based apparatus for locating a center position of all desired characters within a field of characters such that the desired characters can be subsequently recognized using an appropriate classification process. Roughly, OCR 105 operates to translate each visual image of the bit-map into a symbol, character, graphic or, generally, a member of a computer's allowed alphabet which may comprise character or graphic symbol data. For the most part, optical character recognition operates very well. However, for example, characters or symbols of a computer alphabet that look like numbers or vice versa (the letter O and the number 0 or the letter I and the number 1 or the letter z and the number 2) may be confused during OCR processes. It is an object of the present invention to correctly interpret what is presented in an original document or, in other words, increase the probability that an OCR device will properly translate clusters of bit portions of a bit-map accurately into computer intelligible characters or graphic data. The output of the OCR device should be properly translated into computer intelligible characters, symbols or graphic elements.

It is known in OCR 105 how to recognize when the processes may be failing for one reason or another and the OCR process 105 can raise a potential-error flag. The OCR device may not recognize a given bit-map portion at all, and improper recognition of a symbol, character or graphic element should be avoided. An OCR device may compare against a given confidence level for character recognition and raise a flag when the confidence level is not met, signaling a potential error. The result of the flag may be an error display or the like such that an operator at step 110 may review the error flag and, perhaps, take remedial action, if the operator believes action is required. The corrected bit map is then stored in a database (DB) at step 115.

Data rules for correcting erroneous data are known, for example, as described in the article "The Forms Processing Paradigm Shift," appearing in *Imaging Magazine,* March, 1995 at pages 84–106. These rules comprise a vast number of business rules that can be based, for example, on form content as described in this article or in U.S. Pat. No. 5,555,101 to Larson or U.S. Pat. No. 5,608,874 to Ogawa et al. Rules may also be based on business/data logic, for example, as described by R. G. Ross, *The Business Rules Book, Classifying, Defining and Modeling Rules,* Database Research Group, 1997. Ross provides a taxonomy of rules used in the business community.

Figure 5:
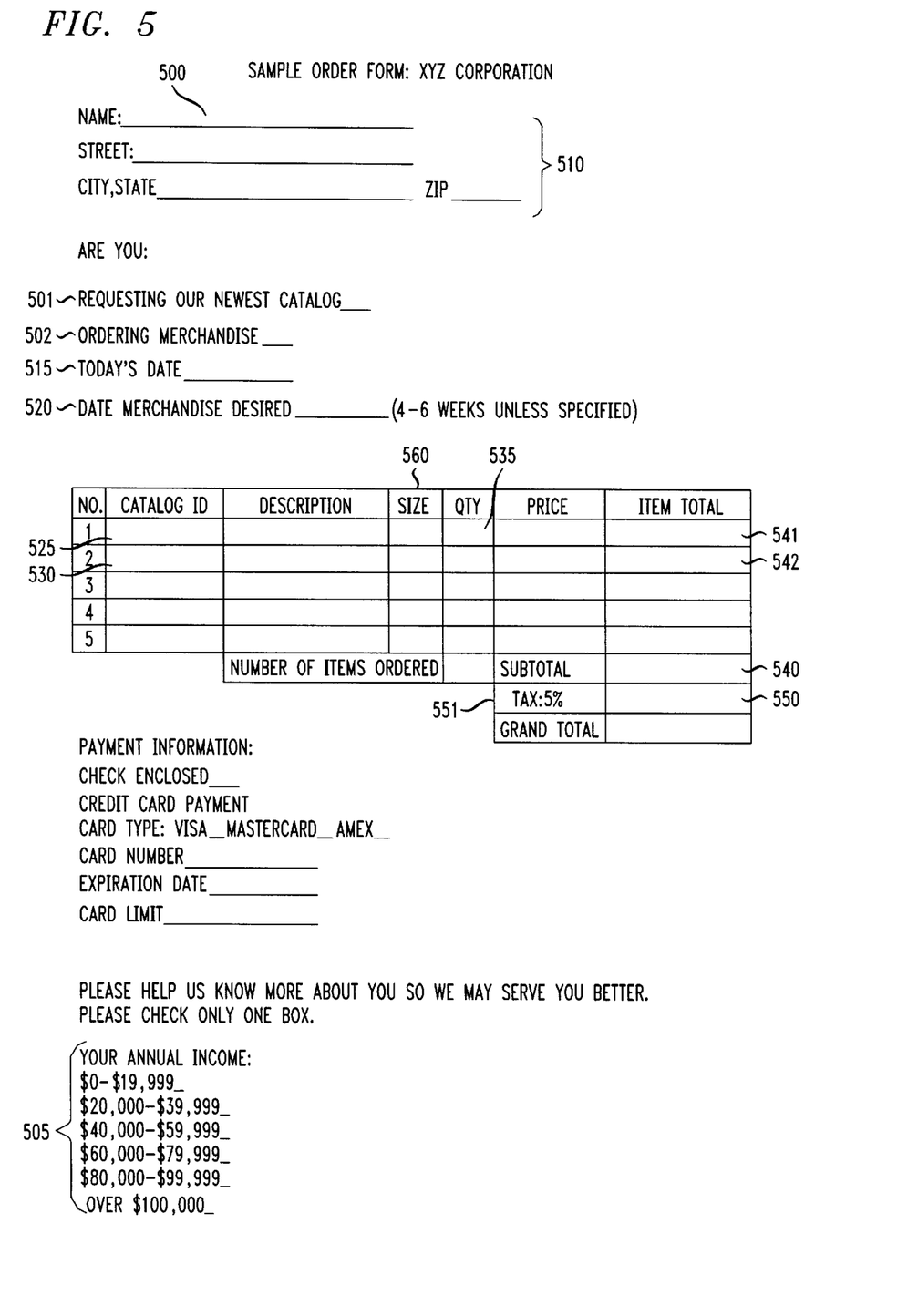
FIG. 5 is a sample of an order form.

Referring to FIG. 5, which comprises a sample order form of a make-believe corporation, XYZ Corporation, the taxonomy of some simple rules and types of rules will be illustrated by way of some specific examples from the depicted form. A first type of rule is an instance verifier. These rules require that the proper data fields be populated. For example, if the NAME field 500 on the facsimile form is not filled in, a rule of this sort is failed. Another example is if neither the "Requesting our newest catalog" field 501 or the "Ordering merchandise" field 502 is checked, a rule of this sort is failed.

A second type of rule is a type verifier. These rules cover a variety of relationships between or among data fields which may or may not be completed. For example, if two boxes are checked for given ranges of annual income 505, then a rule of this sort is failed or, if either or both the "Requesting our newest catalog" field 501 or "Ordering merchandise" field 502 is checked, but no address is provided in address field 510, then a rule of this sort is failed.

A third type of rule is a position verifier. This type of rule requires that certain ordering logic inherent in the definition of the data fields be followed. The ordering may be time or alphabetic or other expected ordering. For example, if the "Today's date" field 515 has a value that is chronologically later than the value of the date in the "Date Merchandise Desired" field 520, then a rule of this sort is failed.

Yet another type of rule is a functional verifier. These rules specify functional relationships among data fields. For example, if the value of the "Catalog ID" field 525 is the same as the value of the "Catalog ID" field 530, then a rule of this sort is failed.

Another type of rule is a comparative evaluator. These rules specify comparative relationships among data fields. For example, if the value of the "Qty" field 535 contains a letter (instead of a number), then a rule of this sort is failed.

A mathematical evaluator is another type of rule. A known or predetermined mathematical relationship must hold for the rule to pass. For example, if the "Subtotal" field 540 has a value that is not equal to the sum of the values of each of the Item Totals, for example, field values 541 and 542, then a rule of this sort fails. Another example is when the Tax field value shown in field 550 is not the correct multiple of the rate 551 and the Subtotal 540.

Naturally, these atomic rules can be combined in an almost unlimited number of ways to create very complicated rules. It is an object of the present invention to apply such a set of rules for correcting erroneous data and combinations thereof in OCR processes.

It is also known in the art to apply error correction logic. Many errors may be corrected automatically. Those that can be corrected are corrected, for example, in known word processing programs, for example, the instance of a small letter i appearing in a sentence may be automatically corrected to a capital I. For example, in a context based system, in fields that must be numeric, the letter O can be changed to the number 0, the letter S can be changed to the number 5 and so on. Of course, in a field that must be alphabetic, numbers may be changed to letters automatically.

There is also a well-established body of logic for correcting errors in street addresses. The logic uses the postal standards as a look-up table in memory to compare street address ranges, city, state and zip or postal code combinations.

In a telecommunications system, it is appropriate, if at all possible to correct errors at a source by applying source correction routines. If an error occurs at a source, due to transmission losses and the like from source to destination to destination, errors can perpetuate and multiply. The output of an OCR device at a final destination likely will not be acceptable. Consequently, it would be appropriate for the final destination to query the original source if possible.

Finally, it is known in some fields to apply learning based algorithms to update a database to reflect current data as data may change over time. It is an object of the present invention to permit OCR devices to learn from verified character recognition and verified context-based recognition of character or symbol strings.

Despite all the known processes and rules described above, there remains an opportunity in the art of optical character recognition to provide enhanced performance.

SUMMARY OF THE INVENTION

Many of the problems and related difficulties of prior art optical character recognition systems are overcome by the principles of the present invention, an optical recognition system that receives an electronic bit map and determines therefrom a context type, selects an appropriate rule base from a plurality of rule bases for the determined context type and then applies the selected rule base, for example, to the received bit map assuming the context type and corrects the bit map before the bit map is permanently stored in a database. By context type is intended in the specification and claims the recognition by an OCR of a document portion or document type such that context-based optical character recognition principles and rule bases may be applied to detect possible errors, generate a level of confidence in a possible error and raise a flag in the event of a possible error, not only from the failure to recognize a symbol or character but a string of characters, symbols or graphic elements from the assumed context type. One or more rule bases may apply to a determined context type. Moreover, the rule base(s) selected for the assumed context type, if not locally available, may be obtained from an external memory and retrieved for loading into an OCR device of the present invention.

The OCR processes of the present invention are performed in modules of an algorithm comprising, for example, the data rules module for correcting erroneous data, error correction modules involving source validation and correction whenever possible and a data creation module when, for example, data completion of missing data is possible. As the error detection and correction functions are performed within the OCR processes of the present invention, an error detection and correction log is established in memory. Corrected errors are marked in the stored context type for use with the next received bit map that may be determined for that bit map or portion thereof.

It is a further principle of the present invention to provide a database enhancement module which permits real-time learning opportunities whereby, for example, the context type data and the data rules module may be updated in real time from source validation. Learning may also occur over the long term from analysis of the error detection and correction log and by error pattern recognition.

In summary, the present invention involves the application of knowledge engineering techniques, data tracking techniques and data quality principles to improve the validity, integrity and quality of information when conventional OCR techniques are employed to interpret a visual image (typically, a bit-map portion) of original information. The present invention is directed to a context type and rules knowledge base for interpreting copies of original information. The context and knowledge base must grow when sources of information change or grow.

These and other features of the present invention will become apparent to one of ordinary skill in the art from studying the detailed description and the appended drawings.

BRIEF DESCRIPTION OF THE DRAWINGS

FIGS. 1A–1C comprise overviews of optical character recognition and FIG. 1D is a block schematic diagram of optical character recognition apparatus wherein FIG. 1B represents an embodiment of the present invention in which the application of a rule base not only detects a possible error but corrects detected errors as well as flags possible errors for operator action; FIG. 1C represents a further embodiment of the present invention comprising a plurality of selectable rule bases and, depending on the received electronic bit-map data, an appropriate rule base is determined and loaded into an OCR processor, possibly from an external source, for processing in a manner as in the embodiment of FIG. 1B.

FIG. 2 represents a process flow chart of an algorithm according to the present invention without "learning" and showing the application of a plurality of modules including a data rules module and an error correction logic module for detecting and correcting errors in an electronic bit map as presented in the overview of the embodiments of FIGS. 1B and 1C.

FIGS. 3 and 4 represent process flow charts associated with a database enhancement module whereby the embodiment of FIG. 2 is supplemented with "learning"; FIG. 3 represents real-time learning processes relying on source or operator validation of data correction and FIG. 4 represents long-term learning processes relying on error-pattern recognition from study of an error detection and correction log generated according to the process flow of FIG. 2.

DETAILED DESCRIPTION

Figure 1B:
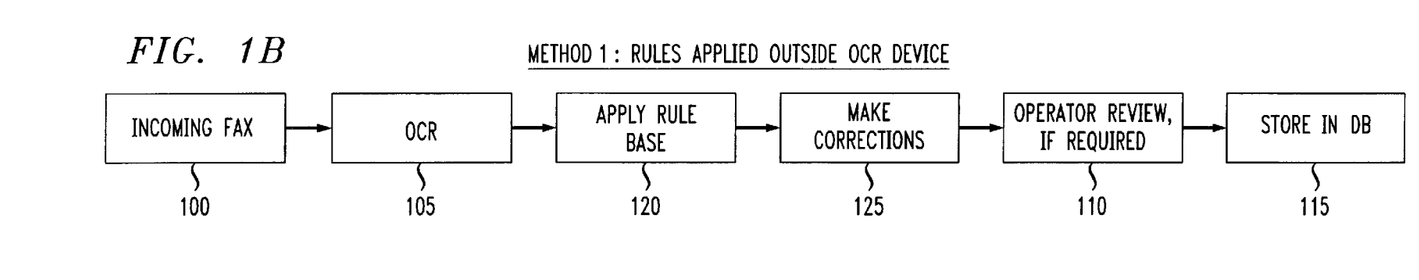
Figure 1C:
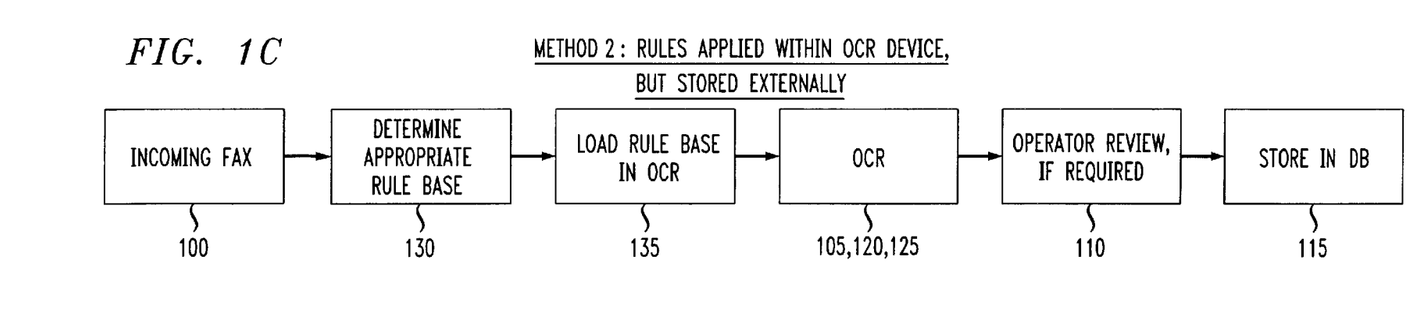
Figure 1D:
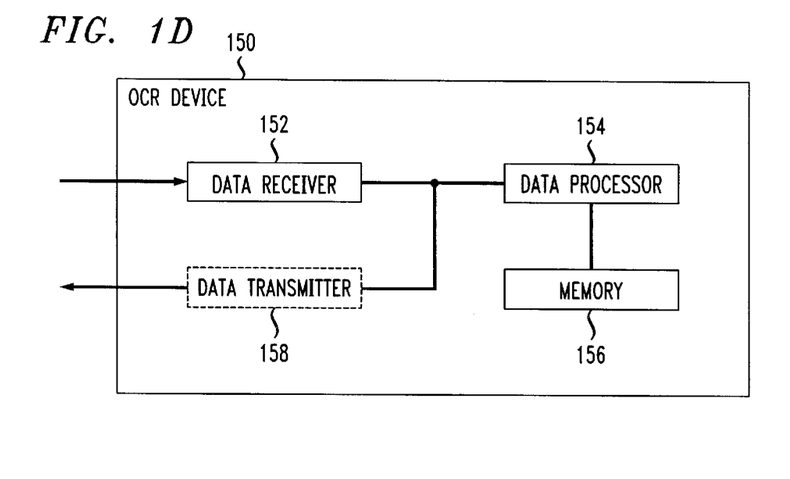
FIG. 1D represents a block schematic diagram of one embodiment of optical character recogntion apparatus according to the present invention.

Referring now to FIGS. 1B, 1C, and 1D an overview of the present invention will be provided. Once an overview has been provided, a particular embodiment of the present invention will be described in detail with reference to FIGS. 2–4. According to FIG. 1B, known process flow of optical character recognition according to FIG. 1A is enhanced by the application of a rule base at step 120 and corrections performed at step 125 prior to operator review step 110. A rule base, as thoroughly defined earlier, comprises a set of rules or combinations of rules that may be associated with a received electronic bit map data. Different types of business forms, for example, or other document types may be recognized by context type and a rule base or set of rule bases determined for the determined context type. For example, a rule base or set of rule bases for a business order form (an example of a context type) of FIG. 5 may be assembled in real time and/or selected separately from a rule base for pages of a magazine or for a facsmile cover sheet (other examples of context types).

Today, computers, from large scale main frame computers to personal computers, typically comprise not only keyboards, displays, data processors, even, parallel data processors, random access memory for work-space storage and more permanent hard disc, floppy disc or compact disc data storage but may comprise data modems, facsimile cards, video cards, sound cards and other plug-in cards for, for example, graphics, microphones, cameras, speakers and document scanners. The facsimile card may also comprise a separate processor and memory for temporarily storing a received facsimile electronic bit map or may utilize the memory resources of the personal computer with which it is associated. When combined with fax capability, a computer typically comprises optical character recognition functionality for translating a received elecrtonic bit-map portion into character, symbol or graphic element data of a known computer alphabet. A computer typically communicates with a separate printer for printing the received facsimile.

Referring to FIG. 1D, there is shown a block schematic diagram of optical character recognition apparatus according to the present invention. The present invention may be implemented in a facsimile card, a facsimile card associated with a computer, a facsimile machine, a stand-alone OCR device or other device for processing a received electronic bit map or bit-map portion. At a minimum, the optical character recogntion device 150 of the present invention must comprise a data receiver 152, a data processor 154 and memory 156 and an optional data transmitter. Associated with the data processor 154 are a plurality of modules of an algorithm for performing the OCR processes according to the present invention. All these elements may be implemented suitably in hardware, firmware or software at the discretion of a design engineer, for example, for efficiency or cost purposes, or over time, for example, as memory costs decrease, processing speeds increase and other factors change.

Referring again to FIG. 1B and according to the present invention, bit-map data is received at step 100 where it may or may not be stored in temporary buffer memory (not shown or comprising a part of memory 156) and typical optical character recognition processes are applied at step 105. These include clustering bits of the bit map into bit-map portions and recognizing the bit-map clusters as characters or symbols of a predetermined alphabet. Further, the OCR step 105 involves analyzing the recognized characters as forming data fields. At this time, and as will be further described herein, an attempt will be made to determine a context type for a received bit map and to generate or select and apply one or more generated or known, predetermined rule bases for the determined context type to the received electronic bit-map data at step 120. The received electronic bit-map data comprising recognized characters and data fields and the like may be compared with a plurality of predetermined patterns for different context types and one or more appropriate rule bases assembled from stored rules and from combinations of the stored rules determined appropriately. Rules are stored in memory tables of memory 156 from which tables a rule base appropriate for a determined context type of a received bit-map portion is generated. Also, memory 156 may comprise a plurality of selectable preassembled rule bases which may be selected according to a recognized context type. For example, some context types of bit maps will utilize type and position verifiers, some may require mathematical evaluator rules, others may require combinations of these and other types of rules, still others may not require these rule types or combinations.

Once one or more appropriate rule bases is assembled or selected and applied according to step 120 for a context type, clear errors may be corrected and others flagged as possible errors at step 125. For example, assume an area code context type of a bit-map portion for the character string 703 has been determined. The receipt of a bit-map portion for a 7 achieves a confidence level of 95% where a threshold is 90%. Then a 0 is received with a confidence level of 85% and finally a 3 for the area code context type is received with a confidence level of 90%. The optical character recognition device of the present invention can safely assume that the received characters represent the string 703 if the confidence level for the context type may be sufficiently high, even though the confidence level for the character 0 by itself may be below the threshold confidence level. As will be discussed further herein, the corrected errors can be logged in an error detection and correction log in memory 156, which is generated over time and associated with a particular context type of rule base to bit-map application. After step 125, there will remain possible errors that have been flagged but not corrected. In accordance with conventional processes, an operator may be invited to intervene, for example, via an error display message at operator revision step 110, if required. If there is retransmittal and an error corrected in real-time, so much the better for the improved quality of the output document. Then, if the bit-map portion is corrected or completed, it may be more permanently stored for subsequent printing at a printer or for other eventual use or purpose subesequent to or at store-in-database (DB) step 115. Moreover, the context type may be verified and the rule base updated if possible from the corrected error. The database may comprise a portion of memory 156 or external memory.

It is a further principle of the present invention that there may not be sufficient memory 156 or other resources locally to assemble appropriate rule bases for various context types. For example, there may be limited memory resources in a fax card of a personal computer. Now referring to FIG. 1C, there is an embodiment similar to the embodiment of FIG. 1B but proposing additional steps 130 and 135 which substitute for step 120 of FIG. 1B. It may be necessary to even go beyond the boundaries of the facsimile card, personal computer, facsimile machine or related device housing the present invention for assembling a rule base for a context type. For example, a postal address, postal/zip code directory table may be most conveniently stored as a shared resource for application by many optical character recognition devices either locally or remotely and so information obtained through appropriate Internet, private line or switched data transmission services. Other examples that come to mind include credit card number validation services, banking data services, telephone number/area code data verification services and the like. In order to obtain access to external memory, an optional data transmtter 158 becomes a required element of OCR device 150 of the present invention.

The present invention contemplates forming a plurality of operative modules for accomplishing the tasks suggested by FIGS. 1B and 1C. A first module and necessary module comprises the data rules module for correcting erroneous data. The data rules module has a task of determining a context type and generating, selecting or otherwise obtaining one or more appropriate rule bases for a recognized context type. Memory 156 stores context types and associated rule bases of rules in tables or a plurality of preassembled rule bases which may be selected or lists of addresses of external sources from which to obtain rules or preassembled rule bases or data upon which these act. The output of the data rules module is flagged data errors and possible data errors. By applying context-based knowledge engineering principles, the present invention has a higher liklihood of recognizing and flagging true data errors and flagging possible data errors than prior art processes. As already described, an appropriate rule base may be generated locally, or external resources of rule bases may be utilized to determine errors. The date rules module will contain error detection and correction routines by error type and by combinations of error types depending on the determined context type. Its input processes assume the recognition of characters/symbols and attempts to form data fields and recognize legitimate entries based on context-based assumptions.

The next module that operates on the received data is an error correction logic module. Error correction logic is applied to the clear data errors to correct them. These changes are automatic. In accordance with the present invention, all detected possible and corrected errors are logged in an error detection and correction log of memory, for example, memory 156. Also, data transmitter 158 is triggered by data processor 154 to alert the originator at the original source of the electronic bit map whenever possible according to the present invention, to validate an error correction in real time, and correct an error by asking that data be retransmitted or the like. For example, if the originator of a fax is still available, source correction should be attempted as early in the error correction logic module as possible as experience confirms that errors become harder to correct the later an attempt to do so is made.

At least three embodiments of source correction logic of the error correction logic module, are possible: a "fax-back" method, a "real-time" method and an "operator-assisted" method. In the "fax-back" method, data transmitter 158 faxes back an error message to the original source machine, if known, or transmitting fax machine that originated the data. The message describes the error and requests that it be corrected and replacement data be transmitted. This, of course, assumes that the source machine is equipped to handle such a request in real time. Typically, the enormity of the error is at a level of bit-map portion recognition level equal to or less than a character/symbol recognition level. In the "real-time" method, data are checked prior to final acknowledgment by the receiving fax machine to the originating fax machine that the data was received. If errors are found as the electronic bit map is operated upon by the OCR processes of the present invention, an error message and request for correction are, as in the fax-back method, transmitted back to the source fax machine by data transmitter 158. This real-time method assumes, for example, more than a mere character/symbol recognition error. It suggests a more complex error such as a context-based error where a rule base for a context type is applied and fails. Moreover, it may require a protocol change to existing facsimile machine protocol to permit examination of the whole received document. For example, a zip code such as "22186" is partially received —2X186— and document correction and retransmittal is suggested to the originating machine so the X is clearly received as a 2. Finally, in an operator assisted source correction process, an operator is alerted. For example, the operator of the receiving fax machine calls an operator of a source machine to resolve an error through operator intervention. The human may be asked to intervene to resolve and retransmit a misspelled name such as "Htomas" corrected by retransmittal of a new original to read —Thomas—.

Error correction logic may also comprise a related operator correction module permitting operators to detect and correct data errors "by eye" that are not detected and corrected by automatic error correction method or detected as possible errors. Moreover, the operator performing the correction may operate to correct the error at either the source or a destination. These processes are shown as processes 110 in FIG. 1.

Also incorporated in an error correction logic module may be a data creation sub-module. This sub-module may be viewed as a special type of error correction logic for recognizing and utilizing certain redundancies in data to advantage. Partial bit maps of intended complete characters may be automatically completed if a threshold confidence level is reached. On a larger scale and referring to FIG. 5, data fields may be completed from incomplete data. An example might be a Size scale field 560 with permissible entries of small, medium and large. The last five letters of the permitted entry "medium" are non-informative. On the other hand, if the extra letters are present, they lead to an increased degree in confidence in a context-based determination. Incomplete data in a recognized "medium" entry may be completed automatically from the combination of recognizing partial bit-map portions for characters/symbols and building a degree of confidence in recognition of the work medium from applying rule bases to a context type selected for sizes. Another example may be a zip code plus four digit directory look-up, where the zip code plus four digits is completely identified by the street address, city and state. Yet, the bit-map portions for the hand-written or machine input data may be unrecognizable at first but reach a confidence level where the data may be created. Vice versa, at least the city and state may be determined by a postal or zip code and, hence, data may be created to replace partial ommissions or incomplete data entries.

This leads to a discussion of a database enhancement module as will be described in connection with FIGS. 3 and 4. This module may comprise a special type of data creation module or comprise a sub-module of error correction logic or a separate module. Comparative evaluators may be viewed as rules that check a data field against a field of acceptable values. For example, to determine if an area code of a telephone number is valid, one compares the data field value for area code against a list of possible or known area codes. If the area code is validated, then, no correction is needed. Yet, an area code may change over time, for example, due to the great need for area codes caused, not only by population growth, but by the increase in need for new telephone numbers for facsimile devices, cellular telephones, pagers and the like and for other reasons.

Lists of possible data values, for example, area codes, are themselves valuable and may require the payment of a fee to obtain. For example, these may be provided by a shared resource—telephone number verification, credit card verification, banking account verification and the like. It may be necessary to obtain such information by transmitting data to a remote information source via data transmitter 158. Another example is a list of customer names, for example, a list of airline frequent flyers for a particular airline may be valuable to another airline. Naturally, such lists are themselves rarely perfect. Names can change over time as customers change their names, for example, due to marriage/divorce or personal reasons. One data example that has a very high degree of confidence level may be a social security number, a slightly less degree of confidence may be an address, and maybe even less, a telephone area code. Clearly, a degree of confidence descreases in data the more frequently the data type is likely to change.

For example, the list of permitted area codes for telephone calls changes over time. Until recently, there was only a 201 and a 609 area code for New Jersey. Then, there came 908 and most recently 732. If an exception results from a comparative evaluation and the acquired data is validated by a source or a trusted entity such as the common carrier implementing the new data, then the list of acceptable values may be updated to include the new value in a local rule base. As will be further explained with reference to FIG. 3, a real-time learning process involves source or trusted entity validation of data and an update of a context type and associated set of rule bases as a consequence thereof.

Earlier it has been described that by application of the data rules module for correcting erroneous data, errors are detected and via the error correction module, a log is generated of errors detected and corrected and possible errors. This error log, for example, of memory 156 may be utilized and pattern-recognition principles applied, over a long term, to rule bases for different context types of electronic bit-map portions so that, for example, a new area code may be validated in a rule base of a context type as it more frequently appears for the same geographical area among many telephone numbers situated within that area. Prior errors that have been flagged as possible may be eventually reclassified as valid and the error corrected in analysis of newly received electronic bit maps. Computerized logic can also spot other patterns of errors and suggest corrections to error rules of a rule base. Such logic is more applicable for those data of context types with more dynamic lists (that may change more frequently), for example, name associated with address or telephone number associated with area code.

Figure 2A:
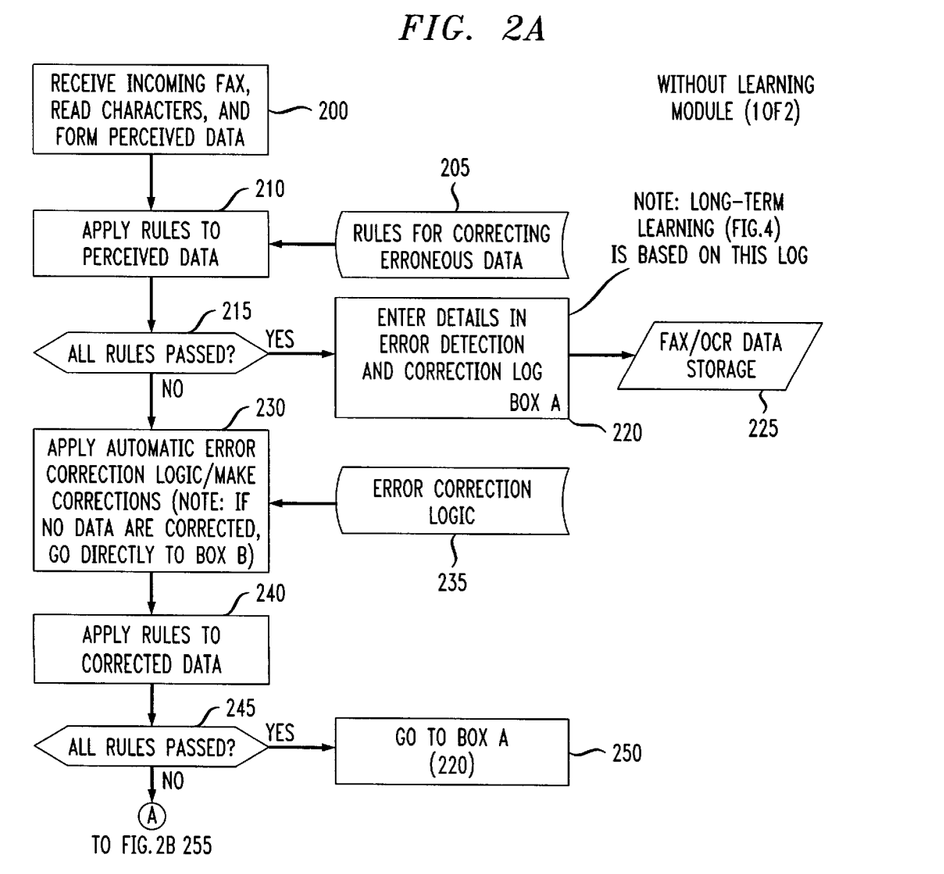
FIG. 2A shows application of the data rules module and error correction logic and FIG. 2B is a continuation of FIG. 2A showing source validation and correction and known operator correction logic.
Figure 2B:
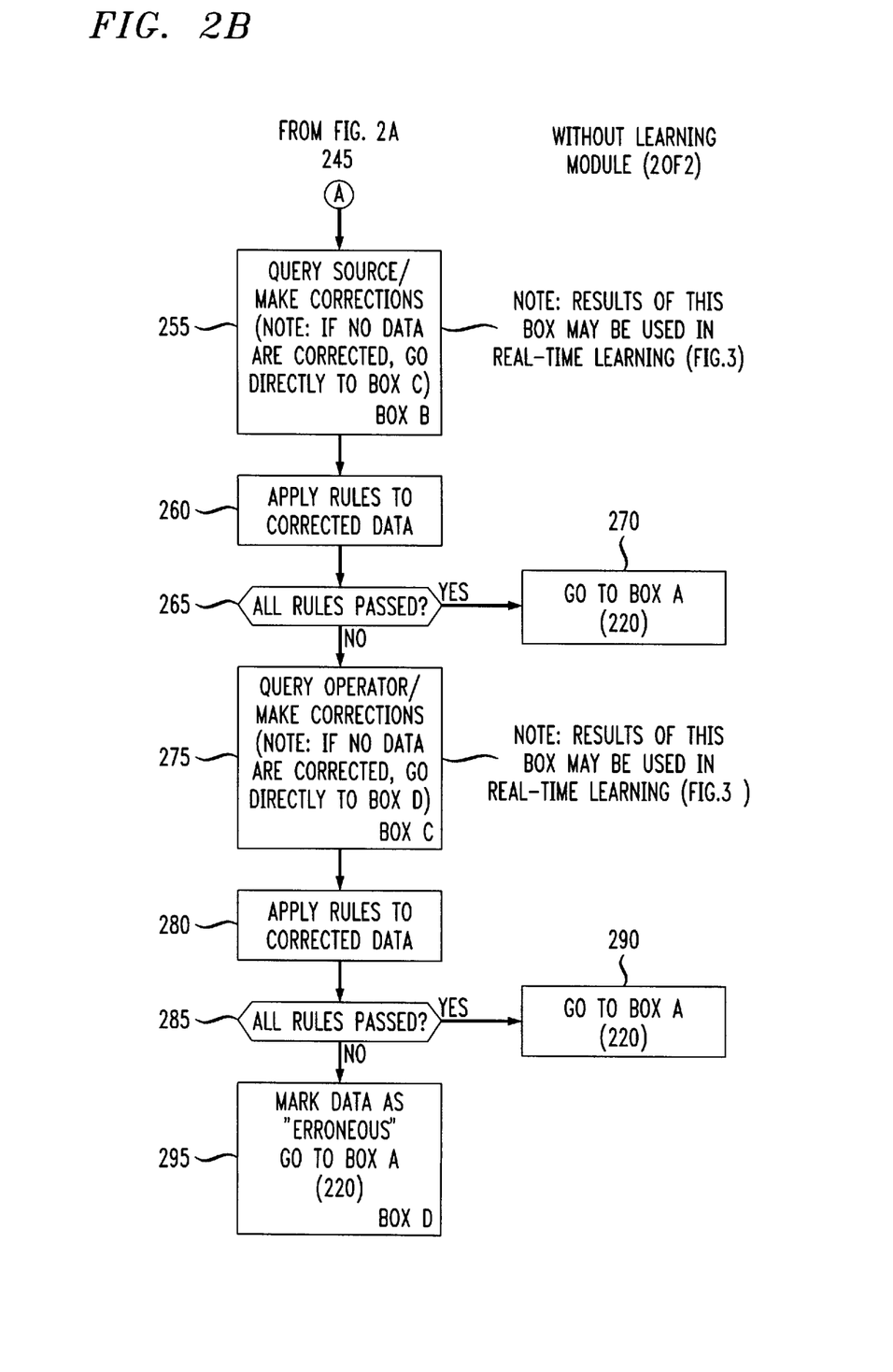
Figure 3:
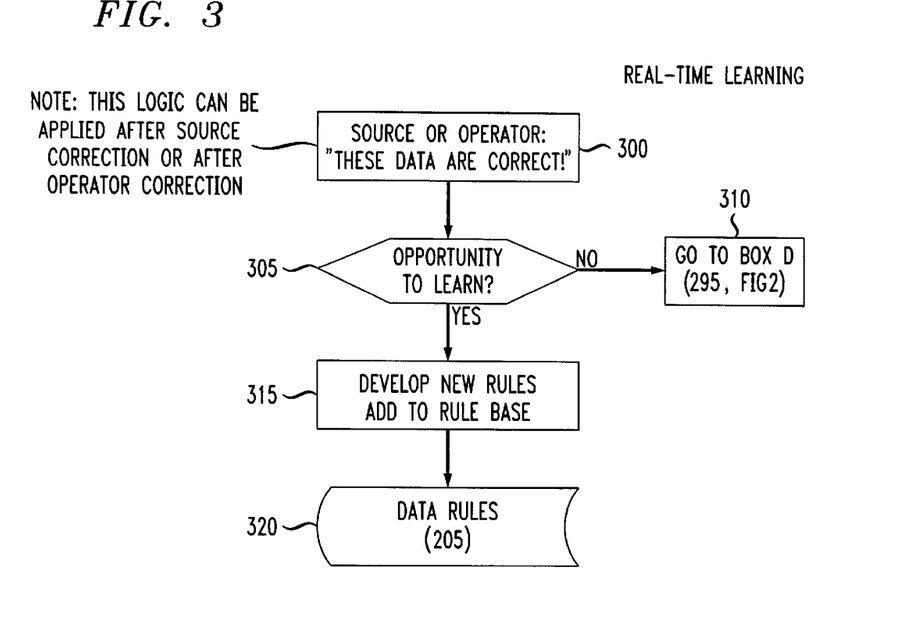
Figure 4:
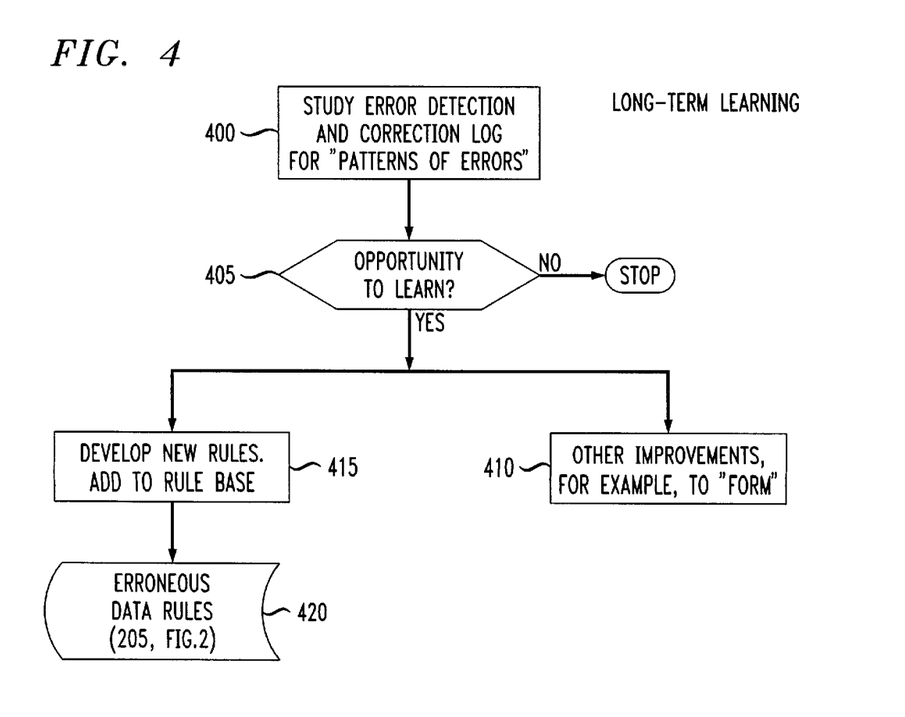

It is important to note that the various modules and sub-modules described above may not necessarily be applied as suggested above or as will be suggested by the flow-charts of FIGS. 2, 3 and 4. In fact, for example, there may be good reason to apply error correction and learning modules in different orders depending on the nature of the expected data. It is also important according to the present invention to not permit an assumption that all data are correct. Use of erroneous data can lead to further errors, for example, as a wrong area code is copied from computer memory file to computer memory file. The present invention assumes that any possible as well as detected error be marked and a copy of the original bit map preserved for the recognition of new errors as will be further described herein.

This leads to a discussion of the error detection and correction log and what data the log may contain. The key to the long-term learning process described by FIG. 4 is the analysis of errors (especially compared with valid data) for their root causes and taking corrective action. Memory requirements may not permit but it is desirable to maintain in a log, for example, of memory 156 all erroneous bit maps and sample bit maps with no errors by context type, for example, the context type for a complete facsimile or portions thereof. The log must also contain with reference to a context type for a bit map or bit-map portion a log of failed rules and the disposition of any attempt to flag as a possible error or to correct each error. Also, the log may comprise an algorithm for periodically summarizing error rates and the most frequently occurring errors using known data quality management techniques. By time-stamping entries as they are made in the log, the log can show the history of a possible error from which the present algorithm may learn. Also, old entries which may no longer be relevant or valuable may be discarded over time, helping to save memory requirements of memory 156 or related external memory.

Now, the process of optical character recognition according to the present invention will be discussed with reference to the flowchart of FIG. 2. In FIG. 2A, step 200 relates to the receipt of an incoming facsimile from a source at data receiver 152, the clustering of a bit map and recognition of characters/symbols and the formation of perceived data. At this time, data processor 154 operates to determine a context type for a bit-map portion and a rule base or collection of rule bases as the data is collected and analyzed. Tables in memory 156 preserve rules, for example, in the context type categories defined above or preserve preassembled rule bases. Data processor 154 builds the appropriate rule base as context type is determined and the bit map is received and analysed. The appropriate rule base may be selected from a plurality of predetermined rule bases preasssembled and stored in memory 156 in accordance with the data processor's recognition, for example, of one context type of bit map as differentiated from another. For example, referring briefly to FIG. 5, an address context type may comprise address fields 510, a name and address combined context type may comprise fields 500 and 510 together. In particular, in the address context type, a zip code portion of an address of an order form and a city and state may be determined by applying rule bases for the address context type. A name may be determined by referral to memory files storing name and address together in context of the combined name/address context type and applicable rule base.

Step 205 represents the loading and application of the rules module for detecting/correcting erroneous data as described above. At step 210, data processor 154 applies the rule base for the determined context type to the received data. Errors which are flagged as possible errors or correctable errors are flagged for correction. Errors are flagged for correction if confidence levels are reached or exceeded as the process of applying rule bases continues. Confidence levels grow within the context types and associated rule bases and rules that are being continuously applied as data is received and analysed. If at step 215, all rules of a generated rule base are passed, then, at step 220, details of the passing of the selected or generated rule base for the context type are logged into the error detection and correction log defined above, for example, in memory 156. As will be further discussed herein with reference to FIG. 4, long-term learning is based on this log. Once the details have been logged and the facsimile/optical character recognition processes completed, the electronic bit map is forwarded to data storage, for example, in memory 156 at step 225, corresponding to step 115 of FIG. 1.

If all rules are not passed at step 215, then automatic error correction logic module 235 is applied to the received bit map. The correction logic corrects errors flagged for correction from applying rules established or selected for the generated context type(s) when the errors reach a threshold confidence level. Furthermore, the correction logic marks what clear errors have been detected and/or corrected and records the results in the error detection and correction log. If no data are corrected, for example, only possible errors flagged, then control moves to Box B appearing as step 255 of FIG. 2B bypassing intermediate steps.

Once the data has been corrected, it is appropriate to reapply the generated or selected rule base for the context type to the corrected data at step 240 to verify whether all data errors have been detected and flagged as possible or corrected. If the answer is yes, then, control returns to box A which is step 220 above, the entry into the error detection and correction log the details of all possible errors, rules failed and corrections and the like for the context type.

If all rules are still not passed of the generated/selected rule base, then, control passes to Box B or step 255 representing source error correction and validation and described in detail above. The destination fax machine or personal computer incorporating OCR device 150 may immediately query the source according to the three methods described above for error detection and correction. If no data is corrected by this route, then, control is passed to Box C or step 275 for operator correction. It is important to note that the results of step 255 may be used in a real-time learning process as described in FIG. 3.

Once source correction has been attempted and as many corrections obtained or possible errors flagged as possible, the rule base or rule bases for the context type is reapplied to the corrected data at step 260. At step 265, if all rules of the rule base are passed, then Box A, step 220 is reentered so the error detection and correction log is maintained. If all rules are still not passed, step 275 representing operator intervention is attempted. This step is related to step 110 of FIG. 1. Typically, a possible error or uncorrectable error is announced to an operator via an error message display. Other errors may be announced by speech synthesis, alarm signals or other annunciation means. If no data is corrected, for example, the operator is unavailable, the operator signals that they see no errors or a predetermined time period lapses, then, the error which is a possible error is marked as such at Box D, step 295, to which control is passed. Note that the results of operator intervention may provide real-time learning as will be discussed further herein with reference to FIG. 3.

Once again, the corrected data is double-checked at step 280 by applying the rules of the generated or selected rule base for the context type. If now all rules are passed, then control at step 290 is returned to Box A, step 220, for logging the corrected errors and so on as already described.

If all rules of the rule base for a context type are still not passed, the process is completed for the most part at Box D, step 295, but for marking the data as erroneous and logging the accumulated erroneous data, corrected data, failed rules and the like into the log via step 220.

An example of the process may be the completion of a name and address field set or context type of an original document. A first level of error correction for the received bit map relates to known processes of comparing a bit-map portion on the order of a character/symbol size. Once a second bit-map portion of the same order or degree of resolution is analysed, context type analysis can begin. For example, name portions such as "Tho-" can be compared against reasonable names (Thomas) and/or known names of individuals from log 156 who have previously submitted data before. The context type may be a name, but as the data analysis continues rule bases and context types grow to combinations of names into a complete name having first name, middle names and last names. Then the names can be combined with street addresses, then with city and state and zip codes and so on each of which may have a given context or opportunity for further correction and analysis taken alone or in combination. A hierarchy of rule bases and context types are built and partial or incomplete data may be corrected if confidence levels are exceeded or possible errors flagged. The iterative process described above can result in a more accurate and valid optical recognition of characters and permit learning so the process can continually improve.

The processes of real-time learning will now be described with reference to FIG. 3. This logic may be applied after source correction or after operator correction or after both have occurred. At step 300, either the source or the operator validates the corrected or original data. The source, the OCR device 150 according to the present invention or its operator may also rely on external sources such as external memory or a trusted entity for data validation as described above. Once the corrected error is validated as a true correction, there exists an opportunity to learn. For example, the rule of the rule base for the context type that has failed may be updated or the data that the rule utilizes updated at step 315. The new rule or modified data utilized by the rule or both are updated in the data rules module 220 represented as occurring at step 320.

If there is no opportunity to learn, then box 295 is entered at step 310 and the error marked for possible long-term learning processes as will be described with reference to FIG. 4, long-term learning. Thus, real-time learning can occur according to FIG. 3 via data transmitter 158 communication with external memory (FIG. 1C) through source validation or from operator intervention. A new, retransmittal from a source can increase the level of confidence to one in which any erroneous data can in deed be corrected or detected and flagged as a possible error.

If one steps back from FIG. 3 what we are accomplishing is the application of knowledge engineering techniques, data tracking techniques and data quality principles to improve the validity, integrity and quality of output of an OCR device. The context and knowledge base for a context type must grow if the sources of information change and grow (and, for example, with telephone area codes, for example, we have learned that they must change and grow).

If incoming information violates no rules, there is little opportunity to learn; perhaps, the confidence level of received context types increases but cannot increase significantly once it reaches a level, for example, of 95%. Uniqueness of information may be seen as a reason for suspecting an error when no other characteristic would suggest one. Uniqueness may also be the first occurence of a perfectly valid or error free event that can result in the creation of a rule for a context type.

A simple example is a new area code. If the only criteria for doubting the validity of an unfamiliar area code is its very uniqueness, there exists an opportunity to learn since it is known that area codes change. An inquiry, for example, to a local exchange carrier will ascertain the validity of a new rule for an area code context type. Thus, an opportunity to learn arises whenever a rule base of information used to valid received data can change or is incomplete.

Now long-term learning will be discussed with reference to FIG. 4. At step 400, the error detection and correction log is studied for patterns of errors. In particular, errors for which no rule base seems to apply are determined at step 295. Over time and from analysis of their repetitive occurence with particular context types of bit maps and analysis via certain generated or selected rule bases, an error may be positively determined as correctable and a rule generated from the error pattern analysis.

At step 405, the question is asked, "is there an opportunity to learn?" There may not be enough data accumulated as yet in memory 156 to positively determine an error, so the learning process stops. Yet, the data is accumulated in the log for a future pattern recognition. In this process, as the log accumulates, it may be appropriate to utilize time-stamping of entries, as is known in the art for other processes, so that patterns can be detected and compared with trusted data entries. For example, if on June 1, a zip code changed, the time stamping associated with a rule and zip code context type may suggest correction of a zip code in an address. Also, very old data may be removed from the error detection and correction log, if it is no longer relevant or valuable. By way of another example, over time, certain incidences of an area code of 908 may be replaced by a new area code of 732, and it may be clearer to error correction logic that a 732 is an accurate entry in a field of a document.

If there is an opportunity to learn, there may be improvements of enhancements to the rule base involving the development of new rules or combinations of rules which may be added to a rule base or data operated thereon updated. These are developed at step 415 and the data rules module called into play to add the new rules or combinations at step 420. For example, as a new area code is deployed in a geographic region, boundaries and maps can be used to compare context types for addresses with those for telephone numbers resulting in the generation of a new rule in a telephone number context that 732 is a valid data entry for an area code. Other improvements are also possible, not just to the rules but to the algorithm, or, for example, to the form (for example, the fax cover sheet or order form of FIG. 5) or to data lists on the form. This analysis is suggested by step 410.

Thus there has been disclosed and suggested a new and improved method and apparatus for optical character/symbol recognition which meets the objectives sought and provides features such as real-time and long-term learning not previously contemplated. Any reference texts, articles or United States patents referenced herein should be deemed to be incorporated by reference as to their entire contents, for example, for the purposes of understanding and implementing the present invention. The present invention should only be deemed to be limited in scope by the claims which follow.

What we claim is:

1. Optical character recognition apparatus for recognizing predetermined characters and symbols in an electronic bit map, said optical character recognition apparatus comprising a data receiver for receiving said electronic bit map, a data processor responsive to said data receiver, said data processor comprising a plurality of modules, the modules comprising a data rules module for determining a context type for a bit-map portion, said data rules module comprising a memory table of rules associated with context types, said data rules module generating a hierarchy of rule bases of selected rules for a plurality of different context types in an iterative process beginning at a character/symbol context type, progressing to a data field context type, said data field comprising a recognizable string of characters/symbols, and further progressing to combinations of different data field context types to flag possible errors so long as all said selected rules fail to pass and an error correction logic module for applying said generated hierarchy of rule bases to correct flagged possible errors and other errors in said electronic bit-map portion if a confidence level is exceeded in accordance with a context type determined by said data rules module and for querying a trusted entity regarding one of a flagged possible error and a corrected other error, and a memory for storing said memory tables, modules, hierarchy of rule bases for context types and electronic bit maps and for further storing an error detection and correction log responsive to said error-correction-logic module when all said selected rules pass.

2. Optical character recognition apparatus as recited in claim 1 wherein said context type represents a string of characters or symbols and said rules comprise instance verifiers, type verifiers, position verifiers and functional verifiers associated with said context type.

3. Optical character recognition apparatus as recited in claim 1 wherein said error correction logic module corrects errors and marks said corrected errors responsive to querying said trusted entity.

4. Optical character recognition apparatus as recited in claim 1 wherein said plurality of modules further comprises a data creation module, said data creation module, responsive to said data rules module, for completing missing data in accordance with said hierarchy of rule bases.

5. Optical character recognition apparatus as recited in claim 1 further comprising a data transmitter for transmitting data related to one of flagged possible data errors and other corrected error to a source of said electronic bit map, said source comprising said trusted entity, wherein said plurality of modules further comprises a database enhancement module, responsive to said data rules module and said error correction logic module, for enhancing a rule base responsive to data validation by said source of said data electronic bit map.

6. Optical character recognition apparatus as recited in claim 1 wherein said plurality of modules further comprises a database enhancement module, responsive to said data rules module and said error correction logic module, for enhancing a rule base responsive to recognition of a pattern of errors recorded in said error detection and correction log by the repeated uniqueness of an error.

7. Optical character recognition apparatus as recited in claim 5 further comprising reception means for receiving a selected rule base from an external memory store responsive to a determination of a context type for a data error by said error correction logic module.

8. Optical character recognition apparatus as recited in claim 1 further comprising a transmitter for communicating with a source of said electronic bit-map data, wherein said error correction logic module comprises source correction logic for communicating a signal representative of an error to said source and requesting retransmittal of an electronic bit map portion associated with said error.

9. Optical character recognition apparatus as recited in claim 1 wherein said error detection and correction log comprises data representing failed rules of said selected rule base and attempts to correct an error.

10. Optical character recognition apparatus as recited in claim 1 wherein generation of a rule base comprises selecting rules from the memory table of rules and forming combinations of selected rules to form a hierarchy of rule bases for a combination of determined context types.

11. Optical character recognition apparatus as recited in claim 1 wherein said error detection and correction log comprises data representing different context types and corresponding erroneous electronic bit maps.

12. Optical character recognition apparatus as recited in claim 5 further comprising a message transmitter operative according to a fax-back process for obtaining corrected data from a source.

13. Optical character recognition apparatus as recited in claim 5 further comprising a message transmitter operative according to a real-time method for obtaining corrected data from a source prior to final acknowledgment of receipt.

14. An optical character recognition method for recognizing predetermined characters and symbols in an electronic bit map, said optical character recognition method comprising the steps of storing a plurality of rules in a rule table, receiving an electronic bit map portion, determining a context type for a received bit-map portion, generating a hierarchy of rule bases by selecting rules from said plurality of rules in response to said determined context type and in accordance with an iterative process beginning at the character/symbol context type, progressing to a data field context type and, and further progressing to combinations of data field context types to flag possible errors so long as all said selected rules fail to pass, said data field comprising a recognizable string of characters/symbols, applying said hierarchy of rule bases to said electronic bit map to correct flagged possible errors and other errors reaching a predetermined confidence level and querying a trusted entity regarding one of a flagged possible error and a corrected other error and storing said electronic bit map responsive to said rule base application step and for further storing and maintaining an error and detection log responsive to said rule base application step when all said selected rules pass and wherein said rule base application step further comprises marking said corrected errors responsive to querying said trusted entity.

15. An optical character recognition method as recited in claim 14 wherein said context type represents a string of characters or symbols for an electronic bit-map portion and said rules comprise instance verifiers, type verifiers, position verifiers and functional verifiers associated with said context type.

16. An optical character recognition method as recited in claim 14 wherein said rule base application step comprises detecting errors, correcting errors and marking said corrected errors responsive to querying said trusted entity.

17. An optical character recognition method as recited in claim 14 wherein said rule base application step further comprises the step of completing incomplete data in accordance with said hirarchy of rule bases.

18. An optical character recognition method as recited in claim 14 wherein said rule base application step further comprises the steps of querying a source of said data, said source comprising a trusted entity, and enhancing a rule base responsive to data validation by said source of said data.

19. An optical character recognition method as recited in claim 14 further comprising the step of enhancing said table of rules responsive to recognition of a pattern of errors recorded in said error detection and correction log by the repeated uniqueness of an error.

20. An optical character recognition method as recited in claim 14 further comprising the step of receiving a selected rule base from an external memory store responsive to a determination of a context type for a data error.

21. An optical character recognition method as recited in claim 14 further comprising the step of communicating a message to a source of said electronic bit-map data identifying an error and requesting retransmission of an electronic bit map portion associated with said error.

22. An optical character recognition method as recited in claim 14 wherein said error detection and correction log comprises data representing failed rules of said rule base and attempts to correct an error.

23. An optical character recognition apparatus as recited in claim 14 wherein the step of generating a hierarchy of rule bases for a context type comprises selecting from the table of rules and forming combinations of selected rules to form a hierarchy of rule bases for a combination of determined context types.

24. An optical character recognition method as recited in claim 14 wherein said error detection and correction log comprises data representing different sample context type and corresponding erroneous electronic bit maps.

25. An optical character recognition method as recited in claim 21 wherein said step of transmitting a message to a source is operative according to a fax-back process for obtaining corrected data from said source.

26. An optical character recognition method as recited in claim 21 wherein said message transmitter step is operative according to a real-time method for obtaining corrected data from a source prior to final acknowledgment of receipt.

27. An optical character recognition method as recited in claim 16 wherein said error correction step comprises the completion of missing data of a bit-map portion if a confidence level is reached.

28. An optical character recognition method as recited in claim 27 wherein said error correction step occurs at a character or symbol level and then at a context based level directed at a string of characters or symbols of an electronic bit-map portion constituting a data field and then at a combination of contexts based level.

29. An optical character recognition method as recited in claim 28 wherein said context based level comprises the step of repetitively determining context types as optical character recognition continues and applying a different appropriate rule base for a new context type as well as the previously identified appropriate rule base.

30. Optical character recognition apparatus for recognizing predetermined characters and symbols in an electronic bit map, said optical character recognition apparatus comprising a data receiver for receiving said electronic bit map, a data transmitter for transmitting data related to one of flagged possible data errors and other corrected errors to a source of said electronic bit map, said source comprising a trusted entity, a data processor responsive to said data receiver, said data processor comprising a plurality of modules, the modules comprising a data rules module for determining a context type for a bit-map portion, said data rules module comprising a memory table of rules associated with context types, said data rules module generating a hierarchy of rule bases of selected rules for a plurality of different context types in an iterative process beginning at a character/symbol context type, progressing to a data field context type, said data field comprising a recognizable string of characters/symbols, and further progressing to combinations of different data field context types to flag possible errors so long as all said selected rules fail to pass, an error correction logic module for applying said generated hierarchy of rule bases to correct flagged possible errors and other errors in said electronic bit-map portion if a confidence level is exceeded in accordance with a context type determined by said data rules module and for querying said trusted entity regarding one of a flagged possible error and a corrected other error, and a database enhancement module, responsive to said data rules module, for enhancing a rule base responsive to data validation by said source of said electronic bit map and a memory for storing said memory tables, modules, hierarchy of rule bases for context types and electronic bit maps.

31. Optical character recognition apparatus as recited in claim 30, said data transmitter being operative according to a fax-back process for obtaining corrected data from a source.

32. Optical character recognition apparatus as recited in claim 30, said data transmitter being operative according to a real-time method for obtaining corrected data from a source prior to final acknowledgment of receipt.

33. Optical character recognition apparatus for recognizing predetermined characters and symbols in an electronic bit map, said optical character recognition apparatus comprising a data receiver for receiving said electronic bit map and for receiving a selected rule base from an external memory store responsive to a determination of a context type for a data error by an error correction logic module, a data processor responsive to said data receiver, said data processor comprising a plurality of modules, the modules comprising a data rules module for determining a context type for a bit-map portion, said data rules module comprising a memory table of rules associated with context types, said data rules module generating a hierarchy of rule bases of selected rules for a plurality of different context types in an iterative process beginning at a character/symbol context type, progressing to a data field context type, said data field comprising a recognizable string of characters/symbols, and further progressing to combinations of different data field context types to flag possible errors so long as all said selected rules fail to pass, said error correction logic module for applying said generated hierarchy of rule bases to correct flagged possible errors and other errors in said electronic bit-map portion if a confidence level is exceeded in accordance with a context type determined by said data rules module, for querying a trusted entity regarding one of a flagged possible error and a corrected other error and for determining a context type for a data error and a database enhancement module, responsive to said data rules module, for enhancing a rule base responsive to data validation by said source of said electronic bit map, and a memory for storing said memory tables, modules, hierarchy of rule bases for context types and electronic bit maps.

* * * * *